United States Patent
Baburajan et al.

(10) Patent No.: US 10,110,154 B2
(45) Date of Patent: Oct. 23, 2018

(54) CONTROLLER AND A METHOD TO DRIVE AN INVERTER CIRCUIT FOR A PERMANENT-MAGNET SYNCHRONOUS MOTOR

(71) Applicants: Robert Bosch GmbH, Stuttgart (DE); Robert Bosch Engineering and Business Solutions Private Limited, Bangalore (IN)

(72) Inventors: Hariprasad Baburajan, Kerala (IN); Thayalan Shanmugam, Tamil Nadu (IN)

(73) Assignees: Robert Bosch GmbH, Stuttgart (DE); Robert Bosch Engineering and Business Solutions Private Limited, Bangalore (IN)

( * ) Notice: Subject to any disclaimer, the term of this patent is extended or adjusted under 35 U.S.C. 154(b) by 0 days.

(21) Appl. No.: 15/609,824

(22) Filed: May 31, 2017

(65) Prior Publication Data
US 2017/0353140 A1 Dec. 7, 2017

(30) Foreign Application Priority Data
Jun. 3, 2016 (IN) .............................. 201641019066

(51) Int. Cl.
| | |
|---|---|
| *H02P 27/06* | (2006.01) |
| *B60L 3/00* | (2006.01) |
| *B60L 11/18* | (2006.01) |
| *H02H 7/08* | (2006.01) |
| *H02M 7/53846* | (2007.01) |
| *H02P 25/022* | (2016.01) |

(Continued)

(52) U.S. Cl.
CPC ............ *H02P 27/06* (2013.01); *B60L 3/0061* (2013.01); *B60L 11/1803* (2013.01); *H02H 7/0805* (2013.01); *H02M 1/32* (2013.01); *H02M 7/53846* (2013.01); *H02M 7/797* (2013.01); *H02P 25/022* (2013.01)

(58) Field of Classification Search
CPC ............................... H02P 27/06; B60L 3/0061
USPC ........................................................ 318/722
See application file for complete search history.

(56) References Cited

U.S. PATENT DOCUMENTS

| | | | |
|---|---|---|---|
| 6,949,906 B2 * | 9/2005 | Boscolo ................... | H02P 6/24 318/530 |
| 9,825,576 B2 * | 11/2017 | Merkel ............... | H02P 29/0241 |

(Continued)

FOREIGN PATENT DOCUMENTS

DE 10 2013 226 560 A1 6/2015

*Primary Examiner* — Kawing Chan
(74) *Attorney, Agent, or Firm* — Maginot, Moore & Beck LLP

(57) ABSTRACT

A controller is provided to drive an inverter circuit for a PMSM. The inverter circuit is connected to a battery through a DC link capacitor, and is driven in one safe state during a fault condition. The controller monitors at least one parameter with respective threshold value to drive the inverter circuit in one safe state comprising an active Short Circuit (SC) and a Freewheel (FW). While in FW state, the controller switches from the FW state to the SC state if the at least one parameter is above the respective threshold. While in SC state, the controller controls engine speed to bring the PMSM to a predetermined speed when the stator temperature is more than a threshold temperature value. The controller switches from the SC state to the FW state.

6 Claims, 4 Drawing Sheets

(51) Int. Cl.
*H02M 1/32* (2007.01)
*H02M 7/797* (2006.01)

(56) References Cited

U.S. PATENT DOCUMENTS

| | | | | |
|---|---|---|---|---|
| 2007/0216327 | A1* | 9/2007 | Sugita | B60L 11/12 318/269 |
| 2010/0202089 | A1* | 8/2010 | Kuehner | B60L 3/0023 361/30 |
| 2011/0232980 | A1* | 9/2011 | Nomura | B60K 6/48 180/65.265 |
| 2013/0041554 | A1* | 2/2013 | Trunk | B60L 3/0061 701/34.1 |
| 2014/0361719 | A1* | 12/2014 | Raichle | B60L 3/0061 318/400.34 |
| 2016/0322927 | A1* | 11/2016 | Merkel | B60L 3/04 |
| 2016/0375774 | A1* | 12/2016 | Lauter | B60L 3/0076 318/400.22 |
| 2017/0077843 | A1* | 3/2017 | Grossmann | B60L 3/0061 |

* cited by examiner

CONTROLLER AND A METHOD TO DRIVE AN INVERTER CIRCUIT FOR A PERMANENT-MAGNET SYNCHRONOUS MOTOR

This application claims priority under 35 U.S.C. § 119 to patent application number IN 201641019066 filed on Jun. 3, 2016 in India, the disclosure of which is incorporated herein by reference in its entirety.

FIELD OF THE INVENTION

The present disclosure relates to a controller to drive an inverter circuit for a Permanent Magnet Synchronous Motor (PMSM) in a vehicle, and particularly relates to a method for controlling the operation of the inverter circuit for the PMSM during a fault condition.

BACKGROUND OF THE INVENTION

In the case of hybrid systems where the electrical machine such as Permanent Magnet Synchronous Motor (PMSM) is always connected to the Internal Combustion engine (IC engine), the PMSM is bound to rotate whenever the IC engine is functioning, even when the electrical machine is not intended to develop torque. If there is a failure/fault identified in the inverter/electrical machine or other components of the hybrid systems, the inverter has to be operated in safe state comprising an active Short Circuit (SC) or Freewheel (FW) state.

When the inverter circuit is driven in the SC state, there is definite amount of no load losses in the PMSM. But on the other hand, being in SC state ensures the galvanic isolation between the battery and the inverter circuit In FW state, the inverter circuit acts like a three phase rectifier due to the anti-parallel diode of switch modules. So when the rectified voltage from inverter circuit is more than the battery voltage, a current flows from the PMSM to the battery through the inverter circuit.

However, if the rectified voltage from the inverter circuit is less than the battery voltage, no current flows from the PMSM back to the battery. Being in FW state does not necessary guarantee electrical isolation between the battery and the inverter circuit. Also, if there is current flow from the inverter circuit to the battery in FW state, a certain amount of power is developed in the PMSM which is used for charging the battery. If the rectified voltage from the inverter circuit is less that the battery voltage, no current flows from the inverter circuit to the battery, and hence there is galvanic isolation between the inverter circuit and the battery, and the losses are minimum.

As a safety measure it is usual practice to make inverter gate driver state as SC when a failure is identified, due to the obvious reason that SC state ensures electrical isolation between High Voltage (HV) battery and inverter. In the case of vehicles which have high torque requirements (like truck and other commercial vehicles) the electrical machine will have high no load losses due to the higher value of the rotor flux. The electrical machine that are needed to develop high torque are designed with high value of rotor flux in order to develop more torque. The higher value of rotor flux causes high no load losses. The no load losses consist of copper loss, eddy current loss and hysteresis loss mainly. Iron loss (Eddy current and hysteresis loss) are proportional to rotor flux. The copper loss ($I^2R$) depends on the current in the machine (High during SC mode operation)

Further, the commercial vehicles usually has long travels without stops. Having the inverter circuit in SC state for a long time causes the electrical machine to heat up as there is high current flowing through its winding. This rise in temperature can potentially damage certain parts in the stator and finally leading to damage of the electrical machine itself. Since, the electrical machine is directly coupled to the IC engine (as in the case of mild hybrids) the machine cannot be isolated from the shaft and so it is bound to rotate along with the IC engine which develops the torque now.

Hence, in brief, whenever a failure is encountered in the hybrid system, the inverter is forced to operate in the SC state, which increases the no load losses and temperature of the electrical machine. But, remaining in SC state for a long time is not suitable since there will a temperature rise in the electrical machine due to no load losses. The electrical machine is likely to get damaged due to the no-load losses when the system is in SC state for a very long time in the vehicles where the electrical machine is directly coupled to the IC engine.

A patent literature DE102013226560 discloses a device and method for operating an electric machine. The invention results in improved switching from the idling mode to an active short circuit mode of an electric machine. The switch from the idling mode to the active electric short circuit mode is delayed until predefined voltage conditions have been reached on the external terminals of an electric machine or until the rotor of the electric machine is in a predetermined position corresponding to the required voltage conditions.

There is a need to provide an efficient method for deciding on which safe state the inverter should operate in case if inverter is requested to be in safe state, under a fault condition. Further, there is a need for minimizing the temperature rise and the negative torque in the electrical machine.

BRIEF DESCRIPTION OF THE ACCOMPANYING DRAWINGS

An embodiment of the invention is described with reference to the following accompanying drawings, FIG. 1 illustrates a schematic of a hybrid vehicle, according to an embodiment of the present disclosure;

DETAILED DESCRIPTION OF THE EMBODIMENTS

Figure 1:
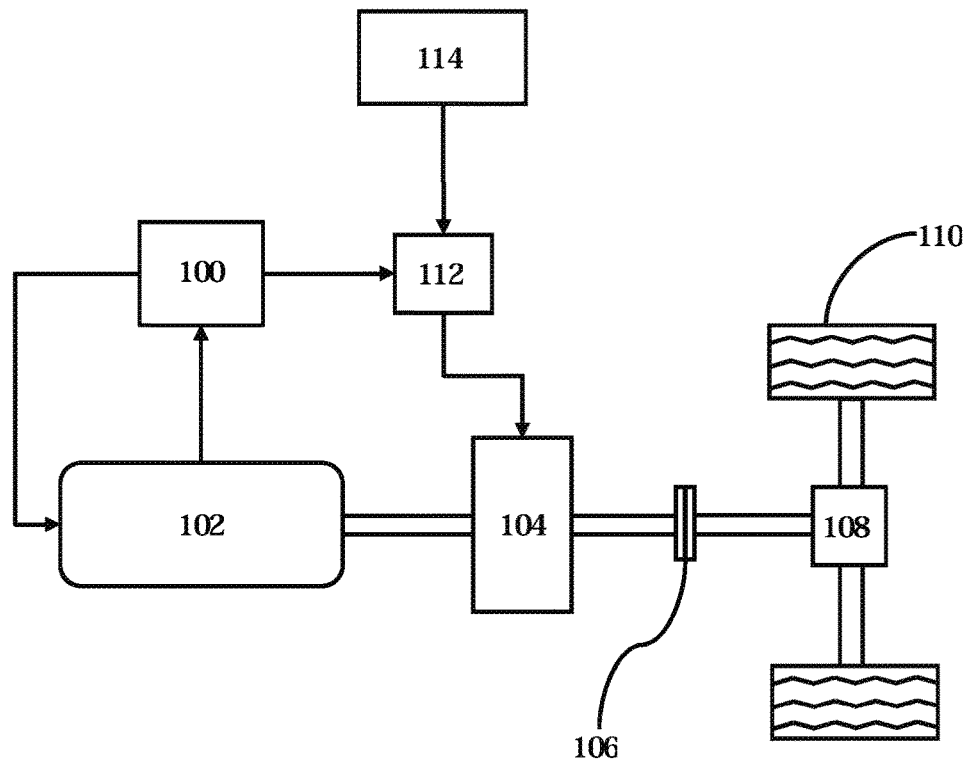

FIG. 1 illustrates a schematic of a hybrid vehicle, according to an embodiment of the present disclosure. A hybrid vehicle is shown with power train topologies (series or parallel) where the electrical machine is always connected to or rotates with the IC engine 102 shaft. In the present disclosure, the electrical machine is a Permanent Motor Synchronous Motor (PMSM) 104. The IC engine 102 is connected to the PMSM 104. A torque transmitting device such as clutch 106 couples the transmission shaft to the wheels 110 through a differential gear 108 as known in the art. Due to the type of coupling, the PMSM 104 is bound to rotate with the IC engine 102 even when the PMSM 104 or the electrical machine is not intended to develop torque.

An Engine/Electronic Control Unit (ECU) (not shown) is provided to control the operation of the IC engine 102. The same ECU is also configured to drive the PMSM 104 as well. Alternately, a controller 100 separate/independent from the ECU is provided to drive the PMSM 104, and is in communication with the ECU through wired or wireless means. Consider a single controller 100 is provided for controlling the operation of the IC engine 102 and driving the inverter circuit 112. The inverter circuit 112 is connected between the PMSM 104 and the battery 114. The semiconductor switches 210-220 as shown in FIG. 2 in the inverter circuit 112 are selectively controlled by the controller 100 to supply power from the battery 114 to the PMSM 104.

Figure 2:
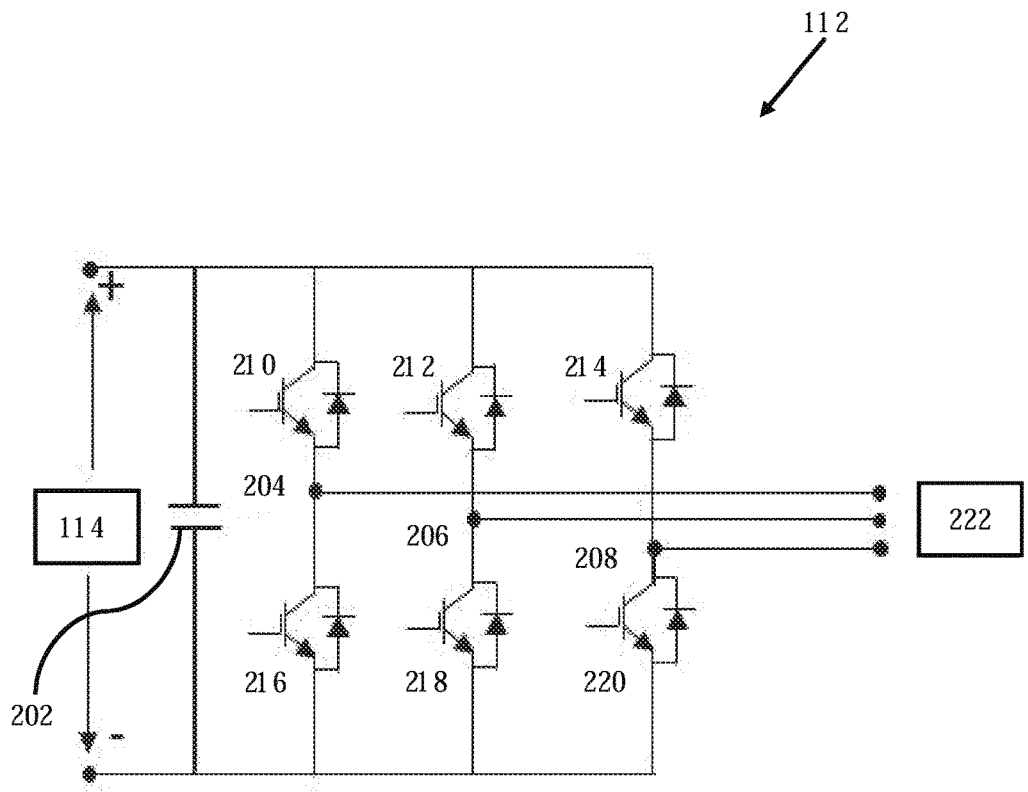
FIG. 2 illustrates an inverter circuit for a Permanent Motor Synchronous Motor (PMSM), according to an embodiment of the present disclosure.

FIG. 2 illustrates an inverter circuit for a Permanent Motor Synchronous Motor (PMSM), according to an embodiment of the present disclosure. The inverter circuit 112 is shown for a three-phase electrical system. The present disclosure is applicable for multi-phase electrical system, with necessary and obvious changes in the elements/components of the inverter circuit 112. The inverter circuit 112 is shown connected to positive and negative terminal of the battery 114. The inverter circuit 112 converts the DC input from the battery 114 to AC output 222. The AC output 222 is connected and supplied to the PMSM 104. The DC link capacitor 202 helps in filtering the DC input. The Dc link capacitor smoothens the DC link voltage, i.e. without DC link capacitor there is a lot of switching harmonics. Additionally, the DC link capacitor improves the transient response of the electrical machine. The inverter circuit 112 comprises six diodes for the three phases U 204, V 206, and W 208. Across each diodes, a semiconductor switch 210, 212, 214, 216, 218 and 220 is provided. The semiconductor switches comprises but not limited BJTs, FETs, IGBTs, thyristors, and the like.

The controller 100 is electrically connected to the inverter circuit 112 through an I/O interface comprising plurality of Input/output (I/O) ports/pins. The controller 100 further comprises a memory element and a processor in communication with the I/O interface through a Bus. The I/O ports of the controller 100 is connected to the semiconductor switches 210-220. The controller 100 also receives inputs from various sensors or other circuits which measures temperature, battery voltage, voltage of the DC link capacitor 202, engine speed, speed of the PMSM 104, and the like. The memory element of the controller 100 stores the instructions to control or drive the inverter circuit 112 as per the requirement at various stages of the vehicle drive. When there is no fault, the controller 100 drives the inverter circuit 112 with appropriate switching. But when a fault is detected, the inverter circuit 112 is driven in one of a safe state. The safe state comprises active Short Circuit (SC) and freewheel (FW). The SC state is one of the safe state for the hybrid system where either all the top switches 210-214 or all the bottom switches 216-220 of the inverter circuit 112 are turned ON/OFF. In the FW state, none of the switches 210-220 are given gating pulses and hence, all the switches 210-220 are OFF. Instead of the controller 100, an Application Specific Integrated Circuit (ASIC) can also be used.

The controller 100 is configured in such a manner that whenever a fault or abnormality or failure is detected, the inverter circuit 112 is alternately driven in SC state and FW state based on status of at least one parameter. The controller 100 also monitors the temperature of the PMSM 104 to decide the switching between the SC state and the FW state and vice-versa.

In accordance to an embodiment of the present disclosure, the controller 100 is provided to drive an inverter circuit 112 for a Permanent Magnet Synchronous Motor (PMSM) 104 in a vehicle. The inverter circuit 112 is connected to the battery 114 through a DC link capacitor 202, and is driven in one safe state during a fault condition. The safe state comprising an active Short Circuit (SC) state and a Freewheel (FW) state. The controller 100 is adapted to monitor at least one parameter with respective threshold value to drive the inverter circuit 112 in one of the safe states. By monitoring, the controller 100 continuously compares the value of at least one parameter received at the I/O port with a threshold value stored in the memory element. While the inverter circuit 112 is operated in the FW state, the controller 100 continuously compares the at least one parameter with respective threshold value, and switches from the FW state to the SC state if the at least one parameter is above the respective threshold value.

Figure 3:
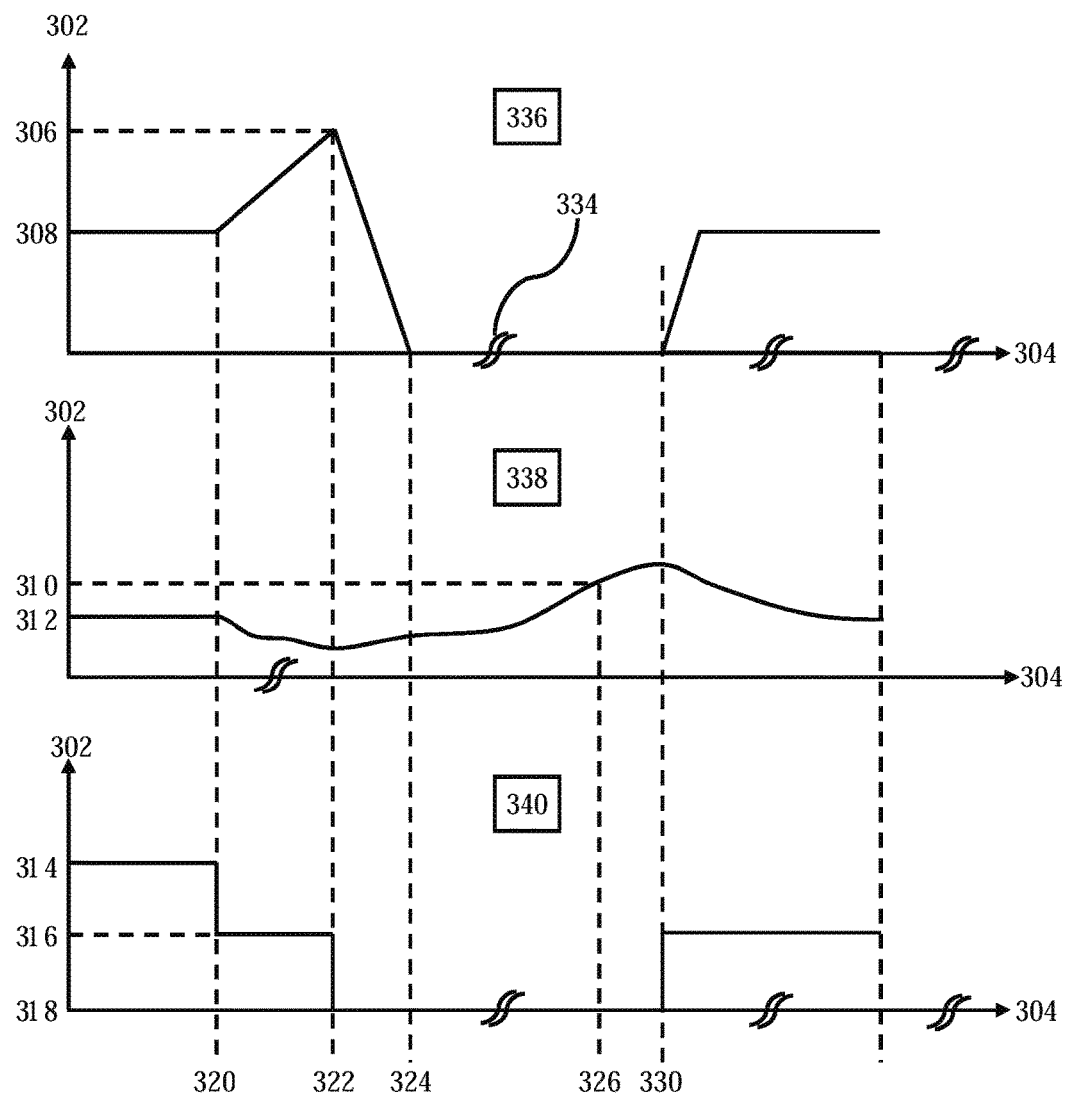
FIG. 3 illustrates switching of the inverter circuit between SC state and FW state through waveforms, according to an embodiment of the present disclosure.

But while the inverter circuit 112 is operated in the SC state, the controller 100 controls engine speed to bring the PMSM 104 to a predetermined speed when stator temperature (312) is detected to be more than the threshold temperature value (310), and switches from said SC state to the FW state. With reference to FIG. 3, the controller 100 monitors a stator temperature 312 with a threshold temperature value 310 when the inverter circuit 112 is driven in the SC state. The controller 100 then controls engine speed to bring the PMSM 104 to a predetermined speed when the stator temperature 312 is detected to be more than the threshold temperature value 310. The controller 100 switches from the SC state to the FW state and drives the inverter circuit 112 in the FW state.

The at least one parameter is selected from a group comprising voltage value 308 (shown in FIG. 3) of DC link capacitor 202 due to rectified output of the inverter circuit 112 generated by the PMSM 104 and speed of the PMSM 104. In accordance to embodiment of the present disclosure, the at least one parameter is estimated without using respective sensor or circuits. The predetermined speed of the PMSM 104 corresponds to a safe speed to switch from the SC state to the FW state without inducing transients in the inverter circuit 112.

The operation of the inverter circuit 112 is switched back to SC state from the FW state based on the at least one parameter. In accordance to an embodiment of the present disclosure, the DC link capacitor 202 is discharged in the SC state. The discharging of the DC link capacitor 202 in the SC state, reduces the transients observed in DC link voltage when the inverter circuit 112 is switched to FW state.

FIG. 3 illustrates switching of the inverter circuit between SC state and FW state through waveforms, according to an embodiment of the present disclosure. The FIG. 3 comprises three waveforms/graphs. The graph 336 is voltage versus time. The Y-axis 302 indicates the voltage of the DC link capacitor 202 due to the rectified output of the inverter circuit 112 in FW state. The graph 338 is temperature versus time. The Y-axis 302 indicates the stator temperature 312 of the PMSM 104 in SC state. The graph 340 is switching signal versus time. The Y-axis 302 is represents switching, which comprises transition between SC state and the FW state. The X-axis for the graphs 336, the graph 338 and the graph 340 corresponds to time in suitable unit and is denoted by 304 respectively.

In the graph 340, until time 320, there is no fault in the hybrid system and the inverter circuit 112 is driven appropriately by the Pulse Width Modulation (PWM) signal 314 from the controller 100. The temperature of the stator of the PMSM 104 is also normal. At time 320, a fault occurs in the hybrid system and the same is detected by the controller 100. Alternatively, the controller 100 receives a request for activation of safe state. The controller 100 checks for the at least one parameter with respective threshold value 306, i.e. the voltage of DC link capacitor 202 and/or speed of the PMSM 104 is measured and compared with respective threshold value 306 stored in the memory element of the controller 100. The speed of the PMSM 104 is used directly, or a voltage indicative of the speed of the PMSM 104 is used as the parameter. The real time voltage 308 for the DC link capacitor 202 is checked with reference voltage/threshold voltage 306. Alternatively, a threshold speed is used if the speed of the PMSM 104 is used as the parameter. Since, the voltage value 308 is below the threshold voltage 306, the controller 100 sends control/command signals to the semiconductor switches 210-220 and drives the inverter circuit 112 in FW state as the first state. If the voltage value 308 is greater than the threshold voltage 306, then the controller 100 operates the inverter circuit 112 in SC state as the first state with appropriate switching signals.

Now, the controller 100 drives/operates the inverter circuit 112 in the FW state until the at least one parameter exceeds/crosses the respective threshold value. The controller 100 sends signal 316 to the inverter circuit 112 for the transition to FW state. At time 322, the controller 100 detects the real time voltage value 308 of the DC link capacitor 202 which is due to the rectified output of the inverter circuit 112, has exceeded (or going to exceed) the threshold voltage value 306. The semiconductor switches 210-220 are immediately switched from the FW state to the SC state as indicated by the signal 318. The controller 100 sends corresponding switching signal to the semiconductor switches 210-220 to drive the inverter circuit 112 in the SC state.

In accordance to an embodiment of the present disclosure, the DC link capacitor 202 is discharged during the SC state. The discharge is evident from the voltage value 308 going to zero between time 322 and time 324.

The controller 100 continues to drive the inverter circuit 112 in the SC mode until the temperature of the PMSM 104 or the stator temperature 312 exceeds a respective temperature threshold value. At time 326, the stator temperature 312 is detected to be exceeding a safe temperature value or a threshold temperature value 310. The detection triggers the necessity of transition from the SC state to the FW state. The controller 100 starts preparing for the transition from the SC state to the FW state as the transition must be done at a predetermined speed of the PMSM 104 to avoid or prevent and transients in the electrical network/connections. In specific, the transition to FW state must not result in rise of voltage value 308 of the DC link capacitor 202 above the threshold voltage 306. Hence, the controller 100 reduces the speed of the PMSM 104 by controlling the engine speed. The controller 100 either directly controls the engine speed by necessary fuel injection and combustion parameters or communicates with the ECU of the vehicle. The transition phase is shown between time 326 and time 330. At time 330, the controller 100 switches from the SC state to the FW state. Once the state changes, the stator temperature 312 starts decreasing thus ensuring the PMSM 104 is not damaged by the extreme heat. The symbol 334 denotes that, the continuity of the state for certain period of time and must not be understood in limiting sense. Here, the inverter circuit 112 waits in the SC state, until the temperature in the electrical machine rises beyond the threshold value. At point 330 the inverter circuit 112 is moved to FW state since the electrical machine temperature exceeds the safe value. In the FW state, the inverter circuit 112 behaves like a three phase full bridge rectifier. Since the speed is reduced to a lower value, the DC link capacitor 202 gets charged to a value less than the threshold value initially. The current flow from the electrical machine to DC link capacitor 202 occurs whenever the voltage at DC link capacitor 202 is lesser than the rectified voltage from inverter circuit 112. If the DC link voltage value 308 is again detected to be crossing the threshold voltage 306, the controller 100 switches to SC state and the process repeats.

In an embodiment of the present disclosure, if there is an error in estimating or measuring the at least one parameter and/or the stator temperature 312, then the controller 100 drives the inverter circuit 112 in SC state by default.

Figure 4:
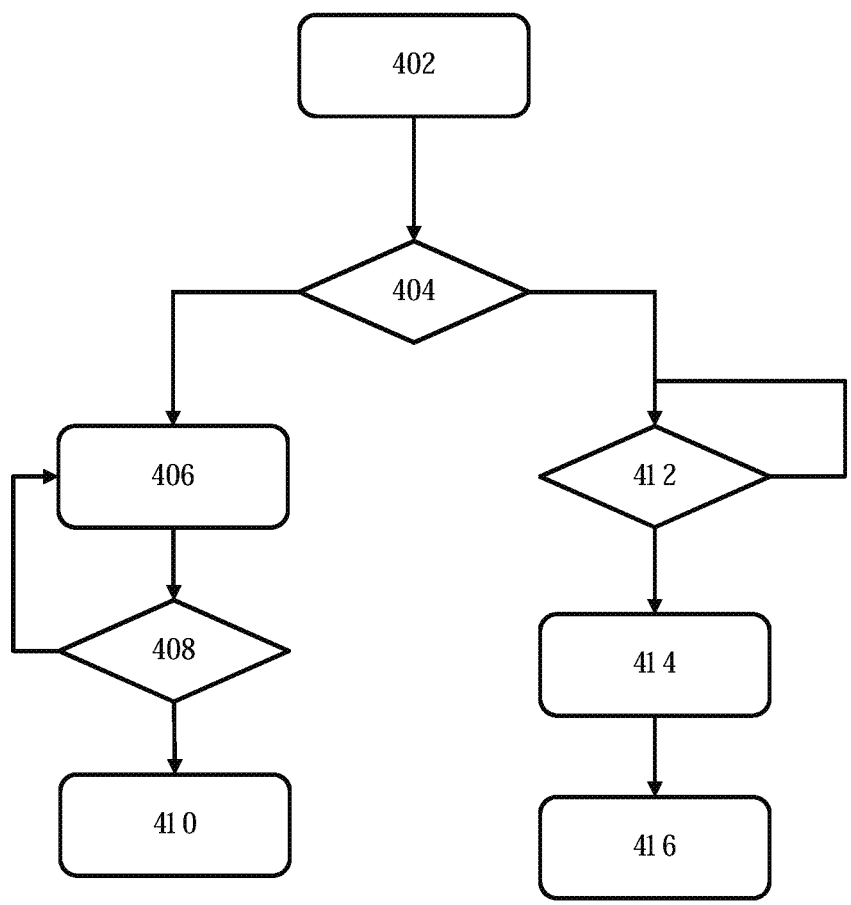
FIG. 4 illustrates a method for controlling the inverter circuit of the PMSM, according to an embodiment of the present disclosure.

FIG. 4 illustrates a method for controlling the inverter circuit of the PMSM, according to an embodiment of the present disclosure. A method for driving the inverter circuit 112 for a Permanent Magnet Synchronous Motor (PMSM) 104 in a vehicle is provided. The inverter circuit 112 is connected to a battery 114 through a DC link capacitor 202. The inverter circuit 112 is driven in one safe state during a fault condition. The safe state comprises an active short circuit (SC) state and a Freewheel (FW) state. A step 402 comprises monitoring at least one parameter with respective threshold value to drive the inverter circuit 112 in one of the safe states. The decision is taken in step 404 as to which safe state the inverter circuit 112 must be driven initially. While operating the inverter circuit 112 in the FW state, a step 406 comprises continuously comparing the at least one parameter with respective threshold value. The step 406 is followed by a step 410 comprising switching from the FW state to the SC state. A step 408 comprises checking a condition based on which the step 410 is executed i.e. safe state is switched from the FW state to the SC state. The condition comprises if the at least one parameter is above the respective threshold or not. If the condition is not met, then the step 406 is repeated, otherwise the step 410 is executed.

While operating the inverter circuit 112 in the SC state, a step 412 comprises monitoring and detecting stator temperature 312 to be more than a respective threshold temperature value 310. If the decision of step 412 is No, then the step 412 repeats. If yes, then a next step 414 comprises controlling engine speed to bring the PMSM 104 to a predetermined speed when stator temperature (312) is detected to be more than said threshold temperature value (310). Once the predetermined speed is reached, then a step 416 comprises switching from the SC state to the FW state.

The at least one parameter is selected from a group comprising voltage value 308 of DC link capacitor 202 due to rectified output from the PMSM 104 and speed of the PMSM 104. The speed of the PMSM 104 is brought down to a predetermined speed to safely switch from the SC state to the FW state. The controller 100 waits till the stator temperature 312 reaches a threshold temperature value 310. The threshold temperature value 310 corresponds to a safe value from tests considering rate at which the temperature rise and maximum temperature till which the PMSM 104 works without being damaged. The controller 100 controls the IC engine 102 such that the speed of the PMSM 104 is reduced below a speed threshold value, below which it is safe for transition to FW state without introducing heavy transients in the DC link capacitor 202 of the inverter circuit 112.

In the FW state, the PMSM 104 cools down, because there is no current flow within the windings of the PMSM 104. The switching from the FW state back to the SC state is performed based on monitoring of the at least one parameter.

The switching between FW state to SC and vice-versa continues to prevent damage to the PMSM 104.

The method for controlling the inverter circuit 112 also comprises discharging the DC link capacitor 202 when the inverter circuit 112 is driven in the SC state. The DC link voltage and the speed of the PMSM 104 increases based on the working of the IC engine 102.

In accordance to an embodiment of the present disclosure, the controller 100 maximizes the use of the FW state as the safe state, so that temperature rise in the PMSM 104 is avoided. In addition, the controller 100 ensures that the copper losses in PMSM 104 is minimum and also prevents the negative torque developed by the PMSM 104. Since in FW state without stator current, there is only core losses and friction loss, the power consumed by the electrical machine and torque is less compared to the SC state where more losses occurs due to the high current in the electrical machine. The battery 114 is the high voltage battery of the vehicle or an external battery. Unnecessary heating and losses happening in the machine is avoided by the controller 100. Since the torque demand in FW state is negligible when compared to that of SC state, the IC engine 102 takes relatively less load when the inverter circuit 112 is operated in FW state. The potential damage of the PMSM 104 is avoided as there is only negligible temperature rise when the inverter circuit 112 is in FW state. The controller 100 prevents failure of the PMSM 104 in mild and other hybrid systems of a vehicle, whenever the PMSM 104 is in safe state.

Since the commercial vehicles like trucks move more or less at same speed in highways the need for acceleration may not last for 600 seconds, which provides the scope for pushing the speed limit imposed on the IC engine whenever a fault is identified in the inverter. This means that without the implementation of present disclosure, in an event of a trivial failure in inverter circuit 112 such as but not limited to communication failures, current sensor failure etc., and the vehicle must stop immediately for repair. But with the implementation of the present disclosure, the vehicle is able to travel/driven to the service station or even the destinations miles away without getting the electrical machine or inverter circuit 112 being damaged.

It should be understood that embodiments explained in the description above are only illustrative and do not limit the scope of this invention. Many such embodiments and other modifications and changes in the embodiment explained in the description are envisaged. The scope of the invention is only limited by the scope of the claims.

We claim:

1. A method for driving an inverter circuit for a Permanent Magnet Synchronous Motor (PMSM) in a vehicle having an engine, the inverter circuit connected to a battery through a DC link capacitor, the inverter circuit driven in one of two safe states during a fault condition, the two safe states including an active short circuit (SC) state and a freewheel (FW) state, the method comprising:

monitoring a voltage of the DC link capacitor, wherein the voltage of the DC link capacitor is based on a rectified output from the PMSM;

comparing the voltage of the DC link capacitor to a threshold voltage value to determine one of the two safe states in which to drive the inverter circuit;

while driving the inverter circuit in the FW state, (i) continuously comparing the voltage of the DC link capacitor to the threshold voltage value, and (ii) switching from the FW state to the SC state in response to the voltage of the DC link capacitor being above the threshold voltage value; and while driving the inverter circuit in the SC state, (i) controlling an engine speed of the engine to bring a speed of the PMSM to a predetermined speed in response to a detected stator temperature exceeding a threshold temperature value, and (ii) switching from the SC state to the FW state when the predetermined speed is reached.

2. The method as claimed in claim 1, further comprising:
reducing the speed of the PMSM to the predetermined speed to safely switch from the SC state to the FW state without inducing transients.

3. The method as claimed in claim 1, further comprising:
discharging the DC link capacitor in response to driving the inverter circuit in the SC state.

4. A controller for driving an inverter circuit for a Permanent Magnet Synchronous Motor (PMSM) in a vehicle having an engine, the inverter circuit connected to a battery through a DC link capacitor, the inverter circuit driven in one of two safe states during a fault condition, the two safe states including an active short circuit (SC) state and a freewheel (FW) state, the controller configured to:

monitor a voltage of the DC link capacitor, wherein the voltage of the DC link capacitor is based on a rectified output from the PMSM;

compare the voltage of the DC link capacitor to a threshold voltage value to determine one of the two safe states in which to drive the inverter circuit;

while the inverter circuit is driven in the FW state:
continuously compare the voltage of the DC link capacitor to the threshold voltage value; and
switch from the FW state to the SC state in response to the voltage of the DC link capacitor being above the threshold voltage value; and while the inverter circuit is driven in said SC state:
control an engine speed of the engine to bring a speed of the PMSM to a predetermined speed in response to a detected stator temperature exceeding a threshold temperature value; and
switch from the SC state to the FW state when the predetermined speed is reached.

5. The controller as claimed in claim 4, wherein the predetermined speed of the PMSM corresponds to a safe speed to switch from the SC state to the FW state without inducing transients in the inverter circuit.

6. The controller as claimed in claim 4, wherein the DC link capacitor is discharged in the SC state.

* * * * *